United States Patent
Lim

(10) Patent No.: US 8,258,756 B2
(45) Date of Patent: Sep. 4, 2012

(54) CURRENT BREAKING METHOD FOR RECHARGEABLE BATTERY AND BATTERY PACK USING THE SAME

(75) Inventor: Sungbin Lim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 434 days.

(21) Appl. No.: 12/417,479

(22) Filed: Apr. 2, 2009

(65) Prior Publication Data

US 2009/0267568 A1 Oct. 29, 2009

(30) Foreign Application Priority Data

Apr. 25, 2008 (KR) ........................ 10-2008-0038888

(51) Int. Cl.
*H02J 7/00* (2006.01)
*H02J 7/04* (2006.01)
*H02J 7/16* (2006.01)

(52) U.S. Cl. ........ 320/155; 320/128; 320/132; 320/134; 320/136; 320/152

(58) Field of Classification Search .................... 320/155
See application file for complete search history.

(56) References Cited

U.S. PATENT DOCUMENTS

| | | | | |
|---|---|---|---|---|
| 3,816,806 | A * | 6/1974 | Mas .............................. | 320/129 |
| 7,560,899 | B1 * | 7/2009 | Potanin et al. ................ | 320/133 |
| 7,830,121 | B2 * | 11/2010 | Sasaki ........................... | 320/134 |
| 2005/0134230 | A1 * | 6/2005 | Sato et al. ..................... | 320/136 |

FOREIGN PATENT DOCUMENTS

| | | |
|---|---|---|
| CN | 1756963 A | 4/2006 |
| EP | 1 455 194 A1 | 9/2004 |
| JP | 09-240392 | 9/1997 |
| JP | 10-150731 | 6/1998 |
| JP | 2000-223161 | 8/2000 |
| JP | 2000-308276 | 11/2000 |
| JP | 2002-204534 | 7/2002 |
| JP | 2004-127532 | 4/2004 |
| JP | 2005-151696 | 6/2005 |
| JP | 2006-115700 A | 4/2006 |

OTHER PUBLICATIONS

SIPO Office action dated Mar. 7, 2011, for corresponding Chinese Patent application 200910135357.X, with English translation, noting listed reference in this IDS.

(Continued)

*Primary Examiner* — Edward Tso
*Assistant Examiner* — Ahmed Omar
(74) *Attorney, Agent, or Firm* — Christie, Parker & Hale, LLP

(57) ABSTRACT

A current breaking method of a rechargeable battery and a battery pack using the same. The current breaking method includes: measuring a current value of a current flowing through a high current path of a rechargeable battery; measuring a duration time of the current flowing through the high current path; setting a permission time for which the current is permitted to flow; and interrupting the current flow when the duration time exceeds the permission time. Thus, the timing for interrupting the current flowing through the high current path of the rechargeable battery is accurately calculated, thereby preventing overheating and explosion of the rechargeable battery.

18 Claims, 6 Drawing Sheets

OTHER PUBLICATIONS

English machine translation of Japanese publication No. JP 2006-115700, published Apr. 27, 2006 in the name of Fujiwara, 13 pages.
Japanese Office action dated Oct. 18, 2011, for corresponding Japanese Patent application 2009-106677, 3 pages.
Patent Abstracts of Japan, and English machine translation of Japanese Publication 09-240392, listed above, 6 pages.
Patent Abstracts of Japan, and English machine translation of Japanese Publication 2002-204534, listed above, 6 pages.

* cited by examiner

CURRENT BREAKING METHOD FOR RECHARGEABLE BATTERY AND BATTERY PACK USING THE SAME

CROSS-REFERENCE TO RELATED APPLICATION

This application claims priority to and the benefit of Korean Patent Application No. 10-2008-0038888 filed on Apr. 25, 2008 in the Korean Intellectual Property Office (KIPO), the entire content of which is hereby incorporated by reference.

BACKGROUND OF THE INVENTION

1. Field of the Invention

The present invention relates to a rechargeable battery, and more particularly, to a method for breaking a current flowing through the rechargeable battery.

2. Description of the Related Art

A typical rechargeable battery includes a nickel-cadmium (Ni—Cd) battery, a nickel-metal hydride (Ni-MH) battery, a lithium (Li) battery and a lithium ion (Li-ion) rechargeable battery, etc. Especially, the lithium ion rechargeable battery has an operating voltage that is three times higher than that of the nickel-cadmium battery or the nickel-metal hydride battery that are commonly used as a power supply of the portable electronic devices. In addition, the lithium ion rechargeable battery has been widely used because it has higher energy density per unit weight.

The rechargeable battery uses lithium group oxides as cathode active material and carbonic material as anode active material. Generally, the rechargeable battery is divided into a liquid electrolyte battery and a polymer electrolyte battery, according to a kind of an electrolyte used in the rechargeable battery. The lithium ion rechargeable battery uses a liquid electrolyte, and the lithium polymer rechargeable battery uses a polymer electrolyte. The lithium ion rechargeable battery has been fabricated in various types such as a can type, a rectangular type, a pouch type, etc.

In addition, a protection circuit is attached to a bare cell lithium ion battery for performing basic charge/discharge functions. The protection circuit is packaged together with the battery to form a battery pack.

The protection circuit installed in the battery pack selects a charging path when the lithium ion battery is connected to a charger, and enables the lithium ion battery to be stably charged. On the other hand, when the lithium ion battery is connected to a portable electronic device, the protection circuit selects a discharging path and enables the battery to be stably discharged. Further, when the lithium ion battery is being charged or discharged, the protection circuit detects an over-current condition by monitoring (e.g., reading) a current value of the lithium ion battery, and breaks a current path of the lithium ion battery when the detected current value exceeds a value (e.g., a predetermined value).

However, the current breaking method has a problem that it is difficult to accurately calculate a current breaking timing according to a current value when the current value is continuously changing.

In addition, the lithium ion battery is gradually overheated when it is continuously being charged or discharged. However, the protection circuit breaks a current path only when the current exceeds a certain threshold value. Therefore, the protection circuit does not take into account the overheating time of the lithium ion battery to determine when to break a current path.

SUMMARY OF THE INVENTION

Accordingly, an aspect of the present invention provides a current breaking method that can accurately calculate a breaking timing of a current flowing through a high current path of a rechargeable battery, and a battery pack using the same.

Another aspect of the present invention provides a current breaking method that can efficiently break a current flowing through a high current path of a rechargeable battery, and a battery pack using the same.

According to an embodiment of the present invention, there is provided a current breaking method of a rechargeable battery, which includes: (a) measuring a current value when a current flows through a high current path of a rechargeable battery; (b) measuring a duration time of the current flowing through the high current path; (c) setting a permission time for which the current is permitted to flow according to a magnitude of the measured current value; and (d) interrupting the current flowing through the high current path when the duration time exceeds the permission time.

The steps (b) and (c) may be performed concurrently.

In the step (a), the current value may be measured by measuring a voltage difference between any two points along the high current path. The value of the measured voltage difference may be converted into an average value or effective value in real time and integrated, and then converted into a current value so as to be used in calculation.

The permission time may be inversely related to the magnitude of the measured current value.

In the step (d), the current may be interrupted when the measured current value exceeds a threshold current value, and the step (a) may be performed to continuously measure the current when the measured current value is lower than a threshold current value.

The permission time may be determined according to an exponential function or an n-th degree equation.

The permission time may be determined by a numerical interpolation of discrete data.

According to another embodiment of the present invention, a battery pack is provided. The battery pack includes: a rechargeable battery; a charge/discharge switching device electrically coupled to a high current path of the rechargeable battery; and a controller electrically coupled to the charge/discharge switching device for turning on/off the charge/discharge switching device. The controller is electrically coupled to the high current path of the rechargeable battery for measuring a current value of a current flowing through the high current path and interrupting the current flowing through the high current path terminal when a time interval corresponding to the measured current value elapses.

The controller may include a first protection circuit for measuring a current flowing through the high current path of the rechargeable battery and controlling on/off of the charge/discharge switching device, and a second protection circuit electrically coupled to the first protection circuit for receiving the current value measured by the first protection circuit and transferring a turn-off signal to the charge/discharge switching device according to the current value.

A sense resistor may be serially coupled to the high current path of the rechargeable battery, and the first protection circuit may calculate a current value by measuring a voltage difference between two points across the sense resistor. The length of the time interval may be inversely related to the magnitude of the current value. The length of the time interval may be related to the magnitude of the current value by an n-th degree equation or an exponential function.

BRIEF DESCRIPTION OF THE DRAWINGS

The above and other features and aspects of the present invention will be more apparent from the following detailed description taken in conjunction with the accompanying drawing, in which.

DETAILED DESCRIPTION OF EXEMPLARY EMBODIMENTS

Figure 1A:
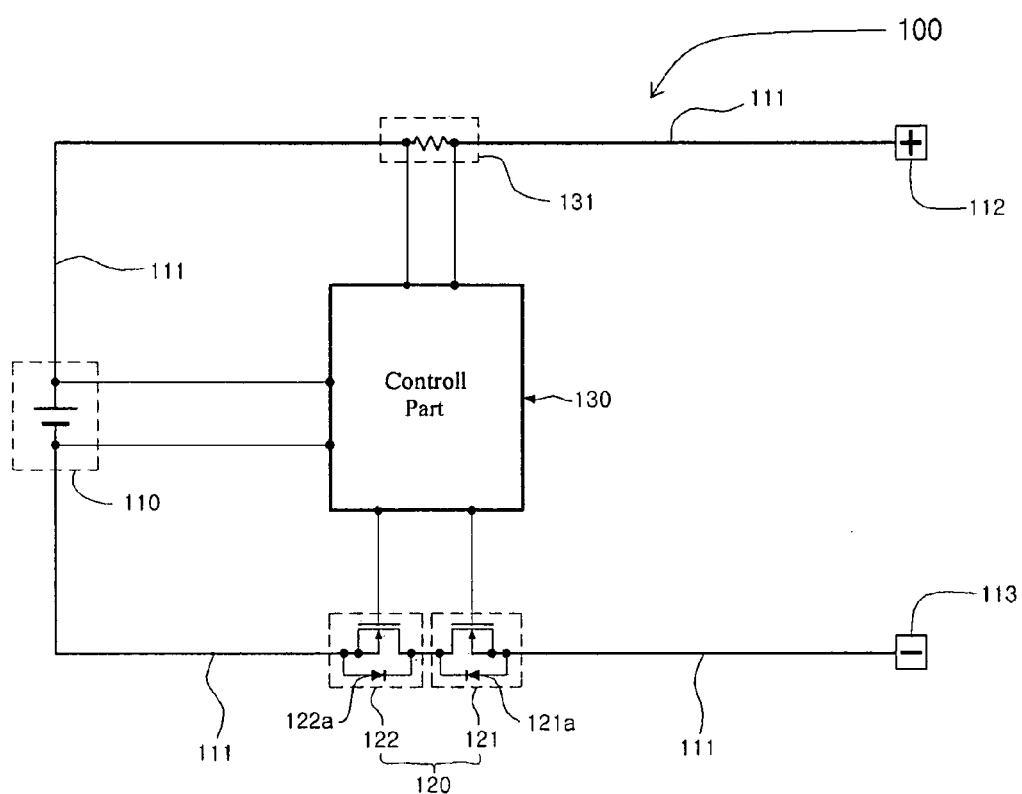
FIG. 1a is a block diagram illustrating a battery pack using a current breaking method according to an exemplary embodiment of the present invention.

Hereinafter, exemplary embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and members, are nothing but specific details provided to assist those of ordinary skill in the art in a comprehensive understanding of the invention, and the present invention is only defined within the scope of the appended claims and their equivalents. In the entire description of the present disclosure, the same drawing reference numerals are used for the same members across various figures.

FIG. 1a is a block diagram illustrating a battery pack 100 using a current path breaking method according to an exemplary embodiment of the present invention. In the drawing, a reference numeral 111 indicates a high current path of a rechargeable battery 110, and a reference numeral 112 indicates a positive charge/discharge terminal, and a reference numeral 113 indicates a negative charge/discharge terminal.

Referring to FIG. 1a, the battery pack 100 includes the rechargeable battery 110, a charge/discharge switching device 120 and a controller 130.

The rechargeable battery 110 is rechargeable and constituted of at least one battery. The rechargeable battery 110 is formed in a pouch type or a can type, or a mixed type thereof, but not limited thereto.

The charge/discharge switching device 120 is electrically coupled to the high current path 111. The charge/discharge switching device 120 is turned on or off by a control signal of the controller 130 when the rechargeable battery 110 is charged or discharged. Further, the charge/discharge switching device 120 may include a charge switching device 121 and a discharge switching device 122. A parasite diode 121a breaking a charge path may be formed at the charge switching device 121, and a parasite diode 122a breaking a discharge path may be formed at the discharge switching device 122. Referring to FIG. 1a, a current flows in a clockwise direction through the rechargeable battery 110 when it is being discharged and flows in a counter clockwise direction when the battery is being charged. The charge/discharge switching device 120 may be formed of one or more field effect transistors. However, kinds, construction and relationship of the charge and discharge switching devices 121 and 122 are not limited thereto.

The controller 130 is electrically coupled to the charge/discharge switching device 120. The controller 130 turns on the charge switching device 121 when a charger (not shown) is connected to the positive terminal 112 and the negative terminal 113. On the other hand, the controller 130 turns off the charge switching device 121 and turns on the discharge switching device 122 when a load is connected to the positive terminal 112 and the negative terminal 113. Further, the controller 130 is electrically coupled to the high current path 111 so as to measure a current flowing through the high current path 111. Referring to FIG. 1a, a sense resistor 131 serially coupled to the high current path 111 is electrically coupled to the controller 130, thereby allowing the controller 130 to measure the current flowing through the high current path 111. Accordingly, the controller 130 can measure a voltage difference between two points across the sense resistor 131 so as to calculate a current value. However, the controller 130 is not limited to the current measuring function. The controller 130 sets a permission time for which the current is permitted to flow, according to the measured current value, and calculates a time elapsed from the time when the current begins to flow. The controller 130 sets the permission time shorter for higher current value and sets the permission time longer for lower current value. The controller 130 breaks or interrupts the current by turning off the charge/discharge switching device 120 when the time of the current flowing exceeds the permission time. The controller 130 may be formed of a microcontroller including a firmware with a plurality of electrical devices or an Application Specific Integrated Circuit (ASIC).

The controller 130 of the battery pack 100 sets a relative permission time according to the current value when the current flows through the high current path 111 of the rechargeable battery 110. The controller 130 of the battery pack 100 measures a time duration for which the current flows, and turns off the charge/discharge switching device 120 when the measured time duration becomes equal to the permission time, thereby preventing overheating and explosion of the rechargeable battery 110. Accordingly, the relative permission time is set according to the current value, and thus, the rechargeable battery 110 of the battery pack 100 is more efficiently charged/discharged. For example, in charging/discharging of a conventional battery pack, when a current of a value lower than a current break value continuously flows, the conventional battery pack is overheated and degraded. Of course, there may be other overheat preventing unit, but it is not efficient because it reacts to a temperature measurement. Here, the battery pack 100 sets the permission time corresponding to the current value and breaks the current when the permission time is exceeded, and thus a current break timing can be more accurately calculated.

Figure 1B:
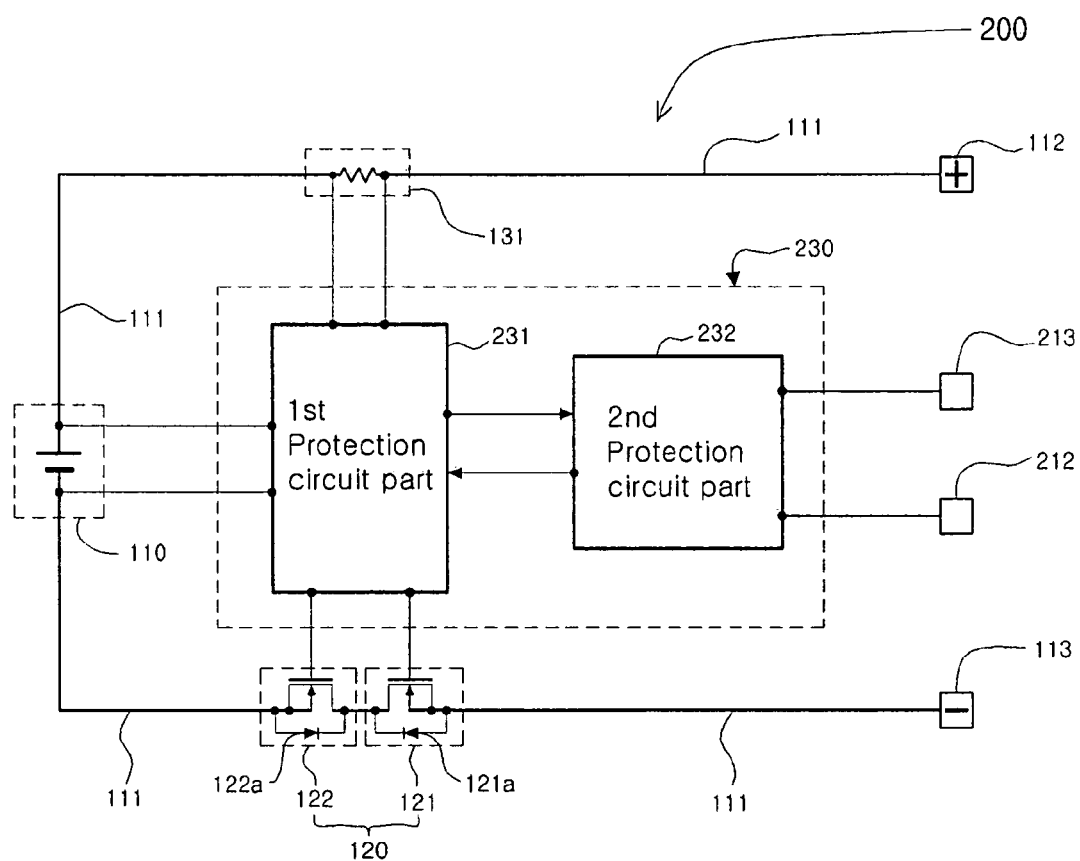
FIG. 1b is a block diagram illustrating a battery pack using a current breaking method according to another exemplary embodiment of the present invention.

FIG. 1b is a block diagram illustrating a battery pack 200 according to another exemplary embodiment of the present invention. In the drawing, reference numerals 212 and 213 indicate auxiliary terminals.

Referring to FIG. 1b, a controller 230 of the battery pack 200 includes a first protection circuit 231 and a second protection circuit 232.

The first protection circuit 231 measures a voltage difference between both ends of a rechargeable battery 110 so as to control on/off of a charge/discharge switching device 120. The first protection circuit 231 is electrically coupled to a high current path 111 of the rechargeable battery 110 so as to measure a current flowing through the high current path 111. Referring to FIG. 1b, the first protection circuit 231 is electrically coupled to a sense resistor 131 so as to measure a current. In addition, the first protection circuit 231 can measure a voltage of the rechargeable battery 110, and turn on or off the charge/discharge switching device 120 according to the measured voltage. For example, the first protection circuit 231 can prevent overcharging by turning off the charge/discharge switching device 120 when overcharging of the rechargeable battery 110 is detected. The first protection circuit 231 may be formed of a logic unit realized by an ASIC.

The second protection circuit 232 is electrically coupled to the first protection circuit 231 so as to receive data detected by the first protection circuit 231, that is, information such as a voltage, a current and a charge/discharge condition. The second protection circuit 232 is electrically coupled to the auxiliary terminals 212 and 213. A portable electronic device or a charger may be electrically coupled to the auxiliary terminals 212 and 213 so as to perform communication with the second protection circuit 232. Further, the second protection circuit 232 receives the current value measured by the first protection circuit 231 and calculates a current value. Also, the second protection circuit 232 sets a relative permission time according to the calculated current value and calculates a time duration for which a current has flowed. Then, the second protection circuit 232 sends a current break signal to the first protection circuit 231 when the time duration of current flowing becomes equal to the permission time. Then, the first protection circuit 231 receives the current break signal and turns off the charge/discharge switching device 120, thereby stopping charge/discharge of the rechargeable battery 110. In addition, the second protection circuit 232 may be formed of a microcontroller including an A/D converter, a built-in timer and a PWM pulse generator with a plurality of electronic devices.

The first protection circuit 231 of the battery pack 200, which has a relatively higher response speed, performs basic functions such as voltage measurement, current measurement and control of charge/discharge switching device 120. The second protection circuit 232 is formed of a microcontroller (or a microprocessor) having a calculation function so as to calculate a current flowing time and set the permission time. Further, the second protection circuit 232 calculates and detects the time when the current flowing time becomes equal to the permission time, and sends a signal to the first protection circuit 231. Here, the second protection circuit 232 of the battery pack 200 can accurately calculate a current break timing of the battery pack 200 because it sets the permission time corresponding to the current value and breaks the current. Thus, in the battery pack 200, the first protection circuit 231 having a higher response speed performs functions such as voltage measurement, current measurement and control of charge/discharge switching device, and the second protection circuit 232 performs a calculation function. Therefore, the battery pack is more efficiently operated, thereby calculating the current break timing more accurately.

Figure 2:
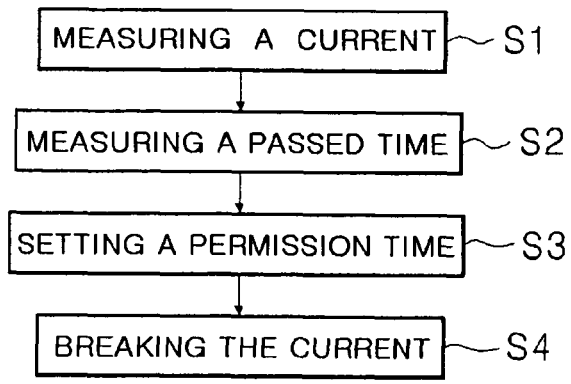
FIG. 2 is a flow chart illustrating a current breaking method according to still another exemplary embodiment of the present invention.
Figure 3:
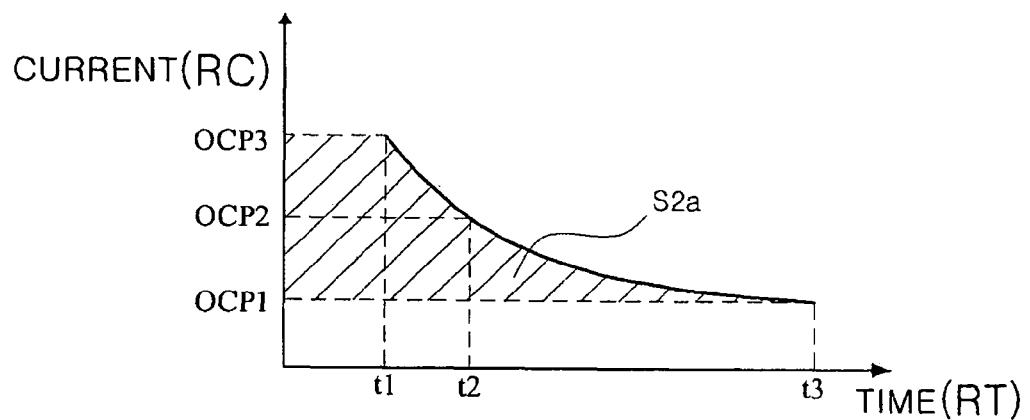
FIG. 3 is a time versus current graph for setting a permission time according to still another exemplary embodiment of the present invention.

FIG. 2 is a flow chart illustrating a current breaking method according to still another exemplary embodiment of the present invention. FIG. 3 is a time versus current graph for setting a permission time according to the still another exemplary embodiment. FIG. 3 shows a graph illustrating the permission time corresponding to a measured current value. In FIG. 3, a horizontal axis indicates a current flowing time RT, and a vertical axis indicates an actual current value RC flowing through the rechargeable battery 110. The current breaking method of the rechargeable battery 110 will be explained below with reference to FIG. 2.

Referring to FIG. 2, the current breaking method of the rechargeable battery 110 includes the steps of measuring a current S1, measuring a time elapsed while the current flows S2, setting a permission time S3 and breaking the current S4.

In the step S1, a current value is measured when the current flows through the high current path 111 of the rechargeable battery 110. For example, the current value may be measured by a microprocessor and a signal microprocessor including an A/D converter, which may constitute a controller 130. Here, the current value may be stored in an internal memory of the microprocessor and/or the signal microprocessor, or bit information corresponding to the current value may be stored in an external memory electrically coupled to the microprocessor and/or the signal microprocessor.

The method of measuring the current value of the rechargeable battery 110 in the step S1 includes various methods. The current value may be measured by measuring a voltage difference between any two points of the high current path and calculating a change of the voltage difference. Then, the current amount flowing through the circuit can be detected by measuring the voltage difference between the two points under the condition that a resistance between the two points is known and stored.

Also, in the step S1, The measured voltage value may be converted into an average value or an effective value in real time and integrated. Then, it may be converted into a current value so as to be used in calculation. The calculation may be performed by the controller 130. In the case where a constant current does not flow through the high current path 111 of the rechargeable battery 110, an amount of energy actually charged/discharged by the rechargeable battery 110 can be measured by converting the measured voltage value into an average or effective current value. Here, the converted average or effective current value may be integrated and accumulated, and an average or effective value of the accumulated current value may be recorded only if it is equal to a predetermined amount. That is, when the internal or external memory of the microprocessor (or microcontroller) constituting the controller 130 is full of data while the average or effective current value is continuously being accumulated, a new current data may be recorded while the corresponding data is erased in an order of first entrance (i.e., a first in first out order). Thus, it is possible to calculate a more accurate amount of energy because the average or effective data value limited to the predetermined amount is calculated even when data representing a peak value such as an instantly inputted impulse current is generated.

In the step S2, a time duration for which the current being measured in the step S1 is calculated. An internal or external timer of the microprocessor (or microcontroller) constituting the controller 130 is operated so as to store the current flowing time in the internal or external memory of the microprocessor (or microcontroller). The timer can be designed of hardware based logic in the microprocessor (or microcontroller). Therefore, the timer may be controlled by a central processing unit of the microprocessor (or microcontroller), or may be resident as data in the form of an algorithm in an internal calculation unit in the microprocessor (or microcontroller).

In the step S3, a permission time for which a current at the current value measured in the step S1 is permitted to flow is measured. The permission time may be set by the controller 130. The permission time for the current flowing in the rechargeable battery 110 is set by the controller 130 according to the current value of the current flowing in charging/discharging of the rechargeable battery 110. The permission time setting method will be described with reference to FIG. 3. FIG. 3 shows a graph illustrating the permission time corresponding to a measured current value, where the horizontal axis indicates a current flowing time RT and the vertical axis indicates an actual current value RC of a current flowing through the rechargeable battery 110. Referring to FIG. 3, in the case where an initial current having a magnitude of OCP1 flows through the high current path 111 of the rechargeable battery 110, when the current flowing time becomes equal to t3, the controller 130 breaks the current that is flowing through the high current path 111 by turning off the charge/discharge switching device 120. In other words, when the magnitude of the current value is OCP1, the permission time is t3. On the other hand, in the case where the initial current having a magnitude of OCP2 that is larger than OCP1 flows through the high current path 111, the permission time is set to t2, and when the current flowing time becomes equal to t2, the controller 130 breaks the current flowing through the high current path 111. Likewise, in the case where the initial current having a magnitude of OCP3 that is larger than OCP2 flows through the high current path 111, the permission time is set to t1, and when the current flowing time becomes equal to t1, the controller 130 breaks the current that is flowing through the high current path 111. That is, when a relationship between a current value RC and a corresponding flow time t is present in a region S2a where current flowing is permitted, the current is permitted to flow. To the contrary, when the relationship is present in a region outside of the region S2a where current flowing is permitted within a current value range of OCP1 to OCP3, the controller 130 breaks the current that is flowing through the high current path 111 by turning off the charge/discharge switching device 120.

In the step S3, the higher the measured current value is, the shorter the permission time may be set, and the lower the measured current value is, the higher the permission time may be. Referring to FIG. 3, when the magnitude of the initial current value is OCP3, the permission time is t1 seconds, and when the magnitude of the initial current value is OCP1, the permission time is t3 seconds. That is, the permission time t1 seconds corresponding to the current value OCP3 is shorter than the permission time t3 seconds corresponding to the current value OCP1. Relatively, the permission time t3 seconds is longer than the permission time t1 seconds. A method of experimentally measuring a change of the permission time according to the current value will be explained as an example. The change of the permission time according to the current can be measured by measuring a current value while a current flowing through the high current path 111 is increased, and recording a time when the controller 130 breaks the charge/discharge switching device 120 according to an increase of the measured current value.

In the step S4, when the current flowing time measured in the step S2 becomes equal to the permission time set in the step S3, the high current path 111 is interrupted. The controller 130 breaks the high current path 111 by turning off the charge/discharge switching device 120. Referring to FIG. 3, the permission time is t2 seconds when the current value is OCP2. In the case where the permission time is set to t2 seconds, when the current flows for more than t2 seconds and a delay time becomes t2 seconds, the controller 130 may generate a control signal so as to turn off the charge/discharge switching device 130.

According to the current breaking method of rechargeable battery, it is possible to protect the rechargeable battery 110 or prevent overheating of the rechargeable battery 110 by breaking the current flowing through the high current path 111 of the rechargeable battery 110. For example, overheating of the rechargeable battery 110 can be prevented by setting the permission time to a suitable value corresponding to the current value, and breaking the current flowing through the rechargeable battery 110 when the current flowing time exceeds the permission time. Thus, it is possible to break a current path more actively or frequently. Here, the current breaking method can be applied to a high current path of a charger (not shown) or a portable electronic device (not shown) that is a load, and thus can protect the charger or electronic device as well as the rechargeable battery 110.

Furthermore, the steps S3 and S2 may be performed concurrently. That is, while the permission time according to the current value is being set when the initial current flows, the current flowing time may be calculated.

Figure 4:
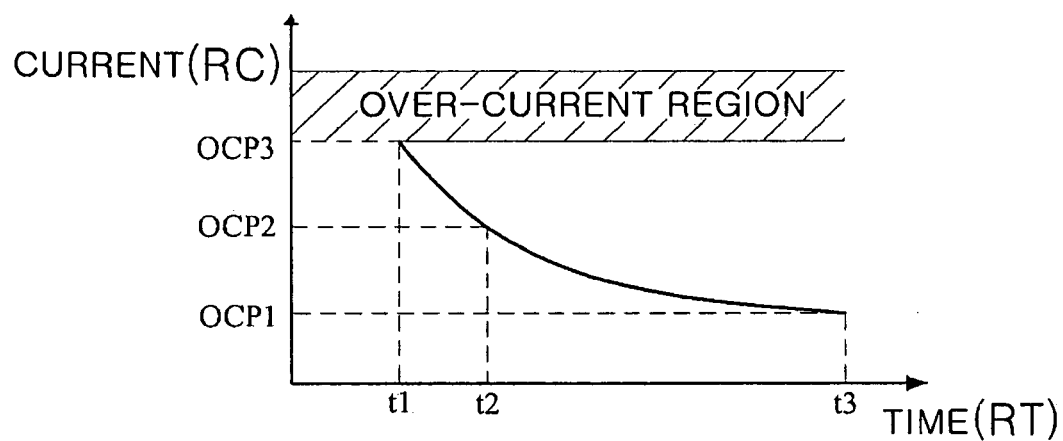
FIG. 4 is a time versus current graph for setting a permission time according to still another exemplary embodiment of the present invention.

FIG. 4 is a time versus current graph for setting a permission time according to still another exemplary embodiment of the present invention. FIG. 4 shows a graph illustrating the permission time corresponding to a measured current value, where a horizontal axis indicates a current flowing time RT, and a vertical axis indicates an actual current value RC flowing through the rechargeable battery 110.

In the step S4, the current is interrupted when the measured current value exceeds a threshold value (e.g., a predetermined threshold value). Referring to FIG. 4, when the current value RC of a current flowing through the high current path 111 of the rechargeable battery 110 exceeds an upper limit value OCP3, it is recognized as an over-current and the current may be interrupted. In other words, when the current value RC exceeds an over-current region shown on FIG. 4, the current (e.g., a charge/discharge current) may be interrupted to prevent abnormal operation such as overheating or explosion of the rechargeable battery 110.

Figure 5:
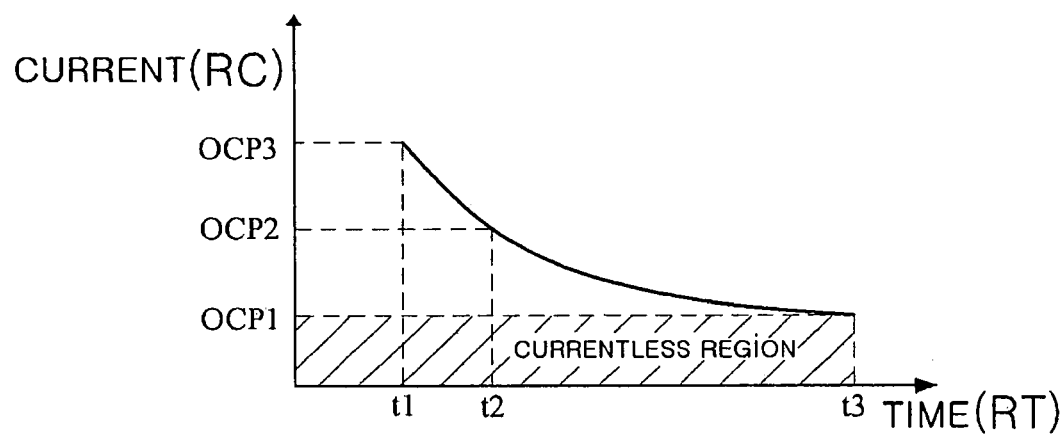
FIG. 5 is a time versus current graph for setting a permission time according to still another exemplary embodiment of the present invention.

FIG. 5 is a time versus current graph for setting a permission time according to still another exemplary embodiment of the present invention. FIG. 5 shows a graph illustrating the permission time corresponding to a measured current value, where a horizontal axis indicates a current flowing time RT and a vertical axis indicates an actual current value RC flowing through the rechargeable battery 110.

In the step S4, when the measured current value is lower than a threshold value (e.g., a predetermined threshold value), the controller 130 proceeds to the step S1 and subsequently measures the current. Referring to FIG. 5, when the current value is lower than a lower limit value OCP1, the controller 130 recognizes it as a currentless state and may stop interrupting the current. That is, when the current value is lower than the lower limit value OCP1, the controller 130 recognizes it as a state in which the rechargeable battery 110 is not charged/discharged and thus stops measuring the current. Thus, the controller 130 does not proceed to each steps S2, S3, S4, and returns to the initial step S1.

Figure 6:
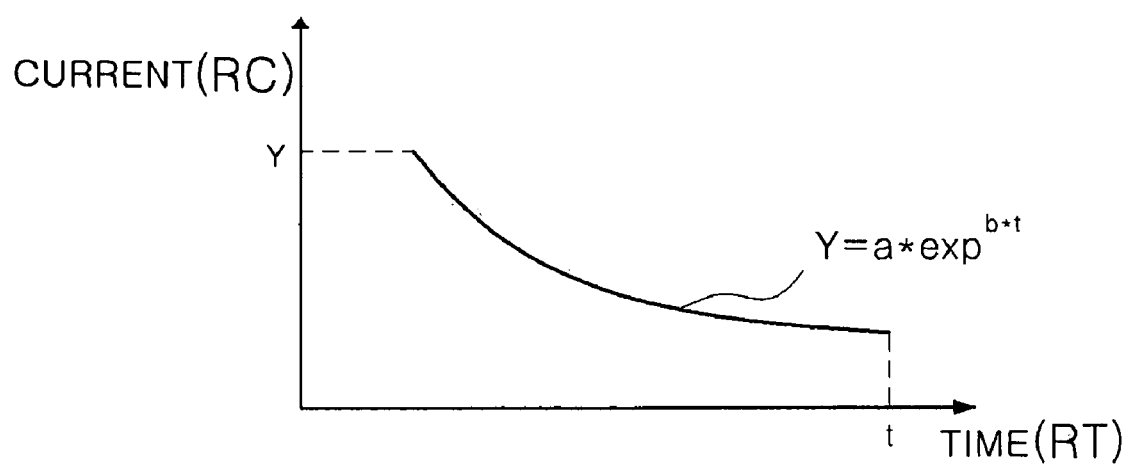
FIG. 6 is a time versus current graph for setting a permission time according to still another exemplary embodiment of the present invention.

FIG. 6 is a time versus current graph for setting a permission time according to still another exemplary embodiment of the present invention. FIG. 6 shows a graph illustrating the permission time corresponding to a measured current value, where a horizontal axis indicates a current flowing time RT and a vertical axis indicates an actual current value RC of a current flowing through the rechargeable battery 110.

In the step S3, the permission time may be set according to a mathematical formula (1) as below.

$$Y = a * \exp^{(b*t)} \text{ ($Y$ is a current value, $a$ and $b$ are constants, $t$ is a permission time, exp is an exponential function)} \quad \text{formula(1)}$$

The formula (1) represents an exponential function, and a profile in a form of the exponential function is shown in FIG. 6. According to the profile in the form of the exponential function, the permission time may be set shorter as the current value increases so as to break the high current path 111 of the rechargeable battery 110.

Here, the formula (1), which is an exponential function, may be implemented by a numerical interpolation of discrete data. That is, data processing can be simplified by storing the continuous exponential function as discrete values in an internal or external memory of a microprocessor (or microcontroller) constituting the controller 130. The discrete data can be obtained by measuring a current value of a current flowing through the high current path 111 of the rechargeable battery 110 while increasing the current value, and then measuring a time elapsed until the charge/discharge switching device 120 is turned off from the time when the current starts flowing, according to the current value. The obtained data can be represented in a graph of exponential function form if the data are connected by using numerical interpolation such as curve fitting or spline as shown in FIG. 6.

Figure 7A:
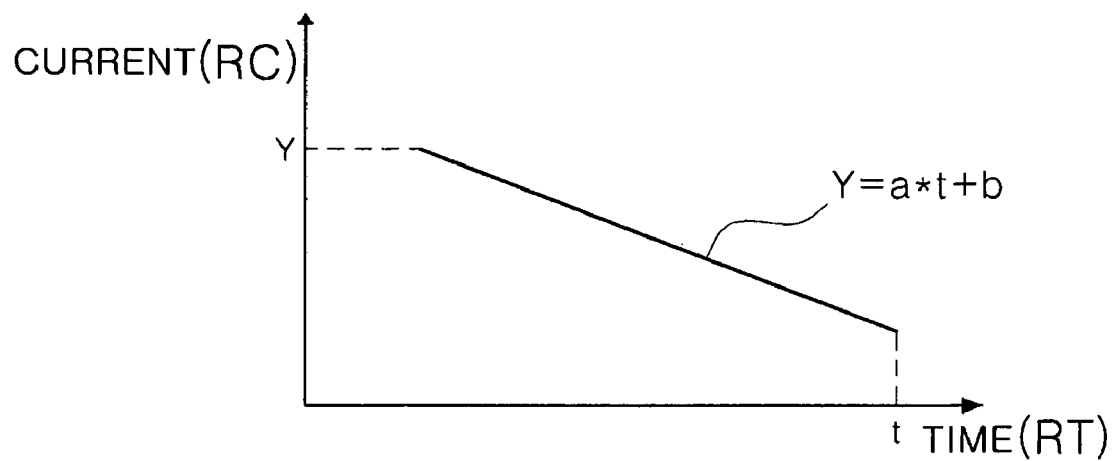
FIGS. 7a and 7b are time versus current graphs for setting a permission time according to still another exemplary embodiment of the present invention.
Figure 7B:
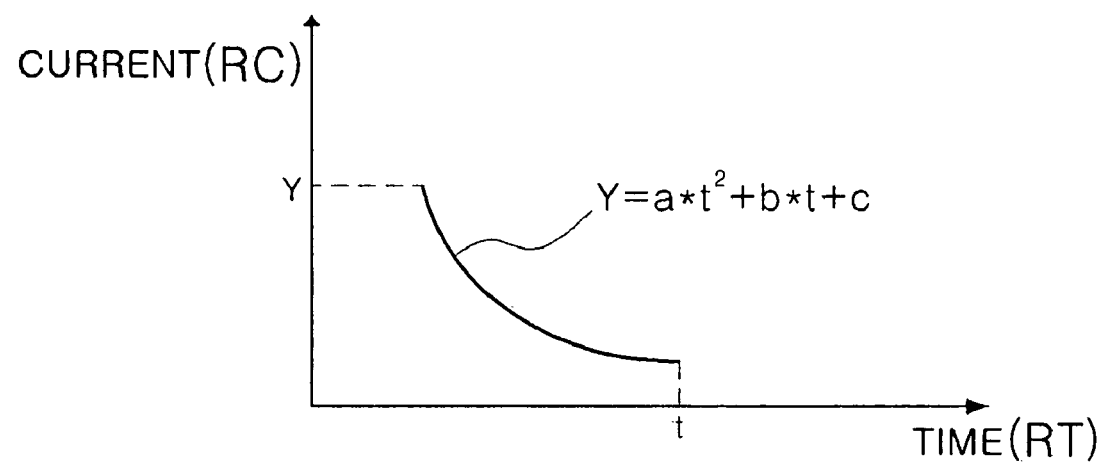

FIGS. 7a and 7b are time versus current graphs for setting a permission time according to still another exemplary embodiment of the present invention. FIGS. 7a and 7b show graphs illustrating the permission time corresponding to a measured current value, where a horizontal axis indicates a current flowing time RT, and a vertical axis indicates an actual current value RC of a current flowing through the rechargeable battery 110.

In the step S3, the permission time may be set according to a mathematical formula (2) as below.

$$Y = a * t^n + b t^{n-1} \ldots + c \text{ ($Y$ is a current value, $a$, $b$ and $c$ are constants, $t$ is a permission time, $n$ is a degree)} \quad \text{formula (2)}$$

The formula (2) is an n-th degree equation of a time variable t. For an example of the n-th degree equation, a profile of a linear equation form is shown in FIG. 7a (Y is a current value, t is a delay time, a and b are constants). According to the profile of linear equation form, the permission time is set in linear inverse proportion to the current value. The current value corresponding to the delay time can be selectively controlled by controlling a slope of the linear equation. In addition, for another example of the n-th degree equation, a profile of a quadratic equation form is shown in FIG. 7b (Y is a current value, t is a delay time, a, b and c are constants). According to the profile of quadratic equation form, offset values of the delay time and current value can be easily changed if only a range of the delay time is limited.

Here, the formula (2), which is a n-th degree equation, may be implemented as discrete data by numerical interpolation. That is, data processing can be simplified by storing the continuous n-th degree equation as discrete values in an internal or external memory of a microprocessor (or microcontroller) constituting the controller 130. The discrete data can be obtained by measuring a current value of a current flowing through the high current path 111 of the rechargeable battery 110 while increasing the current value, and then measuring a time elapsed until the charge/discharge switching device 120 is turned off from the time when the current starts flowing, according to the current value. The obtained data can be represented in a graph of n-th degree equation form if the data are connected by using numerical interpolation such as curve fitting or spline as shown in FIGS. 7a and 7b.

As described above, the current breaking method of a rechargeable battery and a battery pack using the same according to the embodiments of the present invention produce the following effects.

First, the breaking timing of the current flowing through the high current path of the rechargeable battery is accurately calculated, thereby preventing overheating and explosion of the rechargeable battery.

Second, the current flowing through the high current path of the rechargeable battery is more efficiently interrupted.

It should be understood by those of ordinary skill in the art that various replacements, modifications and changes in the form and details may be made therein without departing from the spirit and scope of the present invention as defined by the following claims and their equivalents. Therefore, it is to be appreciated that the above described embodiments are for purposes of illustration only and are not to be construed as limitations of the invention.

What is claimed is:

1. A current breaking method of rechargeable battery, the method comprising:
   (a) measuring a current value when a current flows through a high current path of a rechargeable battery;
   (b) measuring a duration time of the current flowing through the high current path;
   (c) setting a permission time for which the current is permitted to flow according to a magnitude of the measured current value; and
   (d) interrupting the current flowing through the high current path when the duration time of the current exceeds the permission time,
   wherein the permission time is determined according to a first function defined as:

$$Y = a * \exp^{(b*t)}$$

where Y is the current value, a and b are constants, t is the permission time, and exp is an exponential function, or
   wherein the permission time is determined according to an n-th degree equation defined as:

$$Y = a * t^n + b t^{n-1} \ldots + c$$

where Y is the current value, a, b and c are constants, and t is the permission time, n is a degree.

2. The current breaking method of rechargeable battery of claim 1, wherein the current value is measured by measuring a voltage difference between any two points along the high current path of the rechargeable battery.

3. The current breaking method of rechargeable battery of claim 2, wherein the value of the measured voltage difference is converted into an average value or effective value in real time and integrated, and then converted into a current value so as to be used in calculation.

4. The current breaking method of rechargeable battery of claim 1, wherein the steps (b) and (c) are performed concurrently.

5. The current breaking method of rechargeable battery of claim 1, wherein the permission time is inversely related to the magnitude of the measured current value.

6. The current breaking method of rechargeable battery of claim 1, wherein in the step (d), the current is interrupted when the measured current value exceeds a threshold current value.

7. The current breaking method of rechargeable battery of claim 1, while performing the step (d), the step (a) is performed to continuously measure the current when the measured current value is lower than a threshold current value.

8. The current breaking method of rechargeable battery of claim 1, wherein the permission time is determined according to the first function.

9. The current breaking method of rechargeable battery of claim 8, wherein the permission time is determined by a numerical interpolation of discrete data.

10. The current breaking method of rechargeable battery of claim 1, wherein, the permission time is determined according to the nth degree equation.

11. The current breaking method of rechargeable battery of claim 10, wherein the permission time is determined by a numerical interpolation of discrete data.

12. A battery pack comprising:
a rechargeable battery;
a charge/discharge switching device electrically coupled to a high current path of the rechargeable battery; and
a controller electrically coupled to the charge/discharge switching device for turning on/off the charge/discharge switching device, and the controller electrically coupled to the high current path of the rechargeable battery for measuring a current value of a current flowing through the high current path and interrupting the current flowing through the high current path when a time interval corresponding to the measured current value elapses,
wherein the time interval is determined according to a first function defined as:

$$Y = a * \exp^{(b*t)}$$

where Y is the current value, a and b are constants, t is the time interval, and exp is an exponential function, or
wherein the time interval is determined according to an n-th degree equation defined as:

$$Y = a*t^n + bt^{n-1} \ldots + c$$

where Y is the current value, a, b and c are constants, t is the time interval, and n is a degree.

13. The battery pack of claim 12, further comprising a sense resistor serially coupled to the high current path of the rechargeable battery,
wherein the controller calculates a current value by measuring a voltage difference between two points across the sense resistor.

14. The battery pack of claim 12, wherein the controller comprises:
a first protection circuit for measuring the current value of the current flowing through the high current path of the rechargeable battery and controlling on/off of the charge/discharge switching device, and
a second protection circuit electrically coupled to the first protection circuit for receiving the current value measured by the first protection circuit and transferring a turn-off signal to the charge/discharge switching device according to the current value.

15. The battery pack of claim 14, further comprising a sense resistor serially coupled to the high current path of the rechargeable battery,
wherein the first protection circuit calculates the current value by measuring a voltage difference between two points across the sense resistor.

16. The battery pack of claim 12, wherein the length of the time interval is inversely related to the magnitude of the current value.

17. The battery pack of claim 16, wherein the time interval is determined according to the nth degree equation.

18. The battery pack of claim 16, wherein the time interval is determined according to the first function.

* * * * *